(12) United States Patent
Loew et al.

(10) Patent No.: US 10,239,470 B2
(45) Date of Patent: Mar. 26, 2019

(54) VEHICLE WITH AN INTEGRATED SAWHORSE

(71) Applicant: FORD GLOBAL TECHNOLOGIES, LLC, Dearborn, MI (US)

(72) Inventors: Pattrick Loew, Dearborn, MI (US); Brian Robert Spahn, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/266,625

(22) Filed: Sep. 15, 2016

(65) Prior Publication Data

US 2018/0072241 A1    Mar. 15, 2018

(51) Int. Cl.
  *B60R 11/06*    (2006.01)
  *B62D 33/023*    (2006.01)
  *B62D 33/027*    (2006.01)
  *B60R 11/00*    (2006.01)

(52) U.S. Cl.
  CPC ............ *B60R 11/06* (2013.01); *B62D 33/023* (2013.01); *B62D 33/0273* (2013.01); *B60R 2011/004* (2013.01); *B60R 2011/0045* (2013.01)

(58) Field of Classification Search
  CPC .... B60R 11/06; B62D 33/023; B62D 33/0273
  USPC ............... 296/183.1, 37.6, 50, 57.1
  See application file for complete search history.

(56) References Cited

U.S. PATENT DOCUMENTS

| | | | |
|---|---|---|---|
| 3,245,713 A * | 4/1966 | Ogilvie | B60P 3/00 296/37.6 |
| 4,135,761 A * | 1/1979 | Ward | B60R 9/02 29/401.1 |
| 4,880,080 A * | 11/1989 | Brockman | B25H 1/06 182/155 |
| 5,649,734 A | 7/1997 | Speis | |
| 5,829,812 A | 11/1998 | Gionta | |
| 6,224,127 B1 | 5/2001 | Hodge | |
| 6,347,847 B1 * | 2/2002 | Tiramani | B25H 3/00 190/18 A |
| 6,467,417 B1 | 10/2002 | Guyot et al. | |
| 6,641,190 B2 | 11/2003 | Kirchhoff | |
| 6,941,655 B1 | 9/2005 | Bisland | |
| 8,033,435 B1 | 10/2011 | Brooke | |
| 9,669,746 B2 * | 6/2017 | Sterling | B60N 3/10 |
| 2005/0093339 A1 | 5/2005 | Klassen | |
| 2005/0225117 A1 | 10/2005 | Miskech et al. | |
| 2007/0114813 A1 * | 5/2007 | Salvador | B60P 1/435 296/183.1 |
| 2008/0309110 A1 * | 12/2008 | Jones | B60P 3/40 296/57.1 |

(Continued)

FOREIGN PATENT DOCUMENTS

| | | |
|---|---|---|
| EP | 2154022 A1 | 2/2010 |
| WO | 2016028884 A1 | 2/2016 |

OTHER PUBLICATIONS

English Machine Translation of EP2154022A1.
Non-Final Office Action dated Nov. 16, 2017 for U.S. Appl. No. 15/266,698, filed Sep. 15, 2016.

*Primary Examiner* — Jason S Morrow
(74) *Attorney, Agent, or Firm* — Jason Rogers; Vichit Chea; King & Schickli, PLLC

(57) ABSTRACT

An apparatus for a vehicle including a vehicle bed having a wall with a recess formed therein. The apparatus comprises a sawhorse adapted for positioning in the recess of the vehicle bed in a stowed position and removed for use apart from the vehicle. A vehicle with an integrated sawhorse may thus be provided. Related methods are also provided.

17 Claims, 3 Drawing Sheets

(56) References Cited

U.S. PATENT DOCUMENTS

| | | |
|---|---|---|
| 2009/0160206 A1 | 6/2009 | Pleet et al. |
| 2010/0206666 A1 | 8/2010 | Jeeves |
| 2010/0288585 A1* | 11/2010 | Katz ............... B25H 1/04 182/155 |
| 2013/0134733 A1* | 5/2013 | Peters ............. B62D 33/04 296/37.6 |
| 2014/0021232 A1* | 1/2014 | Lazarevich ....... B60P 3/14 224/539 |
| 2015/0102624 A1* | 4/2015 | Kmita ............. B60R 9/06 296/37.6 |
| 2016/0121801 A1* | 5/2016 | Masih ............. B60R 9/06 296/37.6 |
| 2016/0288719 A1* | 10/2016 | Sterling .......... B60R 5/04 |

\* cited by examiner

VEHICLE WITH AN INTEGRATED SAWHORSE

TECHNICAL FIELD

This document relates generally to the motor vehicle field and, more particularly, to a vehicle with an integrated saw horse.

BACKGROUND

Trucks may be used for a variety of purposes, including the hauling of construction equipment in the bed. Space in the bed can be at a premium for temporarily storing items to be hauled. Thus, it would be desirable to provide a means of storing items such as saw horses that are useful on the construction site so as to not take up space in the bed, and yet in a manner that permits readily access for use.

Thus, a need is identified for a vehicle with an integrated sawhorse and, in particular, one that can be stowed in the vehicle out of sight or without taking up space for cargo in the bed, and then removed and deployed for use.

SUMMARY

In accordance with the purposes and benefits described herein, an apparatus for a vehicle includes a vehicle bed including a wall having a recess formed therein. One or more sawhorses are provided, and may be adapted for positioning in the recess of the vehicle bed in a stowed position and being removed for use apart from the vehicle.

In one embodiment, the recess is provided in an upper portion of the wall. The sawhorse may form an upper surface of the wall in the stowed position. The sawhorse may comprise a cross member forming the upper surface of the wall and a plurality of legs stowable within the cross member. The cross member may be color matched with the wall. Alternatively or additionally, a cover may be provided for covering the recess, which may be adapted for receiving the collapsible sawhorse in a travel direction of the vehicle. The recess may also be provided as part of the vehicle tailgate.

A further aspect of the disclosure relates to a vehicle comprising a collapsible, removable sawhorse forming an integral portion of the vehicle. The sawhorse comprises a cross member and a plurality of legs depending therefrom in a deployed condition of the sawhorse.

In one embodiment, the plurality of legs are pivotally connected to the cross member. At least two of the plurality of legs are connected by a folding hinge. The cross member may include a recess for receiving the plurality of legs in a stowed position, and may form an upper surface of a wall of the vehicle forming a portion of a vehicle bed in a stowed position. A cover may also be provided for covering the wall, and the cross member (as well as the cover) may be color matched to the vehicle.

Still a further aspect of the disclosure pertains to a method of providing a sawhorse in connection with a vehicle including a bed having a floor for receiving and supporting objects for transport. The method comprises positioning the sawhorse in a recess formed in a wall forming the vehicle bed. The method may further include the step of unfolding legs recessed within the sawhorse to deploy the sawhorse, as well as covering the recess including the sawhorse.

In the following description, there are shown and described several preferred embodiments of the vehicle with an integrated sawhorse. As it should be realized, the arrangement is capable of other, different embodiments and its several details are capable of modification in various, obvious aspects all without departing from the vehicle with the integrated sawhorse as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle with an integrated sawhorse and together with the description serve to explain certain principles thereof. In the drawing figures.

Reference will now be made in detail to the present preferred embodiments of the vehicle with an integrated sawhorse, examples of which are illustrated in the accompanying drawing figures.

DETAILED DESCRIPTION

Figure 1:
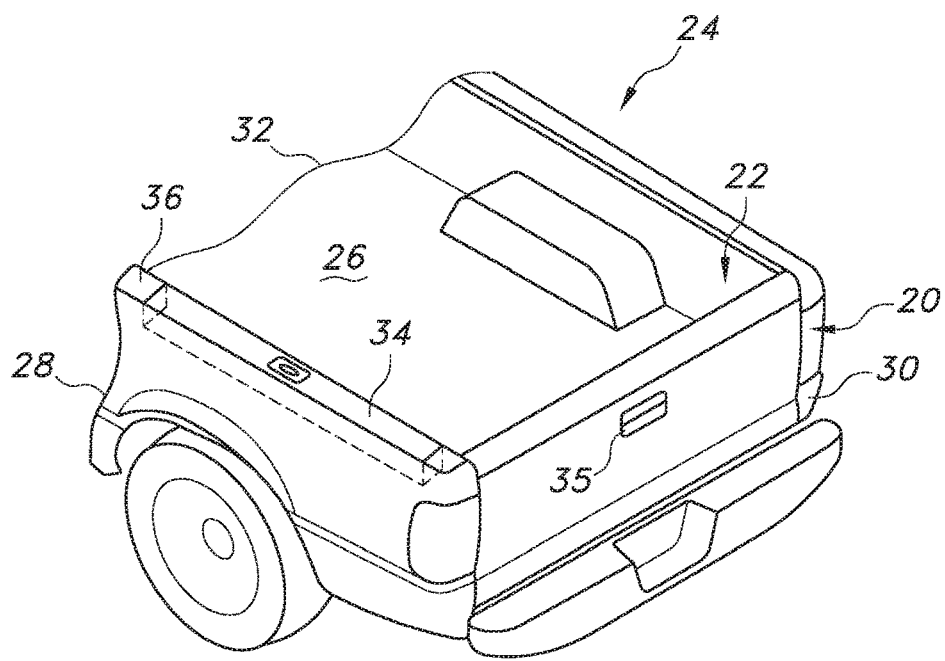
FIG. 1 is a partially cutaway view of a vehicle bed including an integrated sawhorse.

Reference is now made to FIG. 1, which illustrates a vehicle 24, such as a pickup truck. The vehicle 24 includes a storage compartment or bed 26 for receiving cargo that is defined by a left rear quarter panel 28, which forms a first vertical wall defining the bed 26; a right rear quarter panel 30, which forms a second vertical wall of the bed 26; a horizontal wall or floor 32, which extends between the two panels 28, 30; and a tailgate 20, which may be adapted for pivoting between an open condition for exposing the bed 26 and a closed position for partially covering the bed, as illustrated. A suitable handle 35 may also be provided for purposes of releasing the tailgate 20 from a latched condition when closed.

According to one aspect of the disclosure, the bed 26 may be provided with a sawhorse 34 (which is a freestanding structure for supporting one or more workpieces above the ground, and is described in more detail below) that forms an integrated portion of the vehicle 24 (and is thus distinguished from the positioning of a sawhorse in the bed 26 for transport, even if tied to the vehicle). In one embodiment, and with reference to FIGS. 1, 2 and 3, the sawhorse 34 in a collapsed configuration may be recessed within a cavity or recess 38 formed in a first side rail 36. In such a configuration, the sawhorse 34 may form an upper portion or surface of the left rear quarter panel 28, but the recess could be formed in other portions of the vehicle (including, for example the floor 32 of the bed 26).

Figure 2:
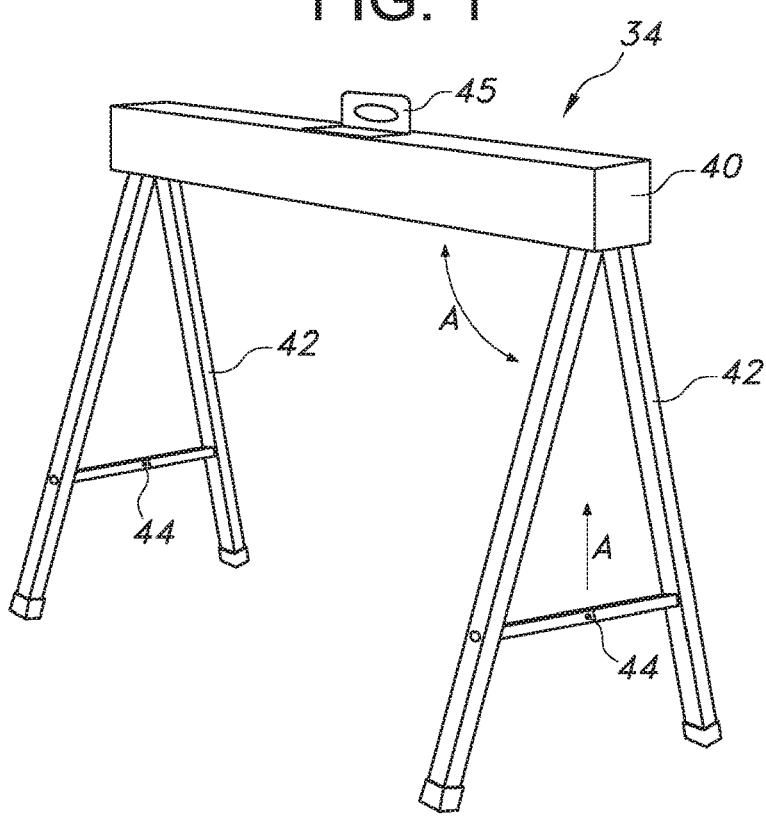
FIG. 2 is a perspective view of a sawhorse for use in connection with the vehicle.
Figure 3:
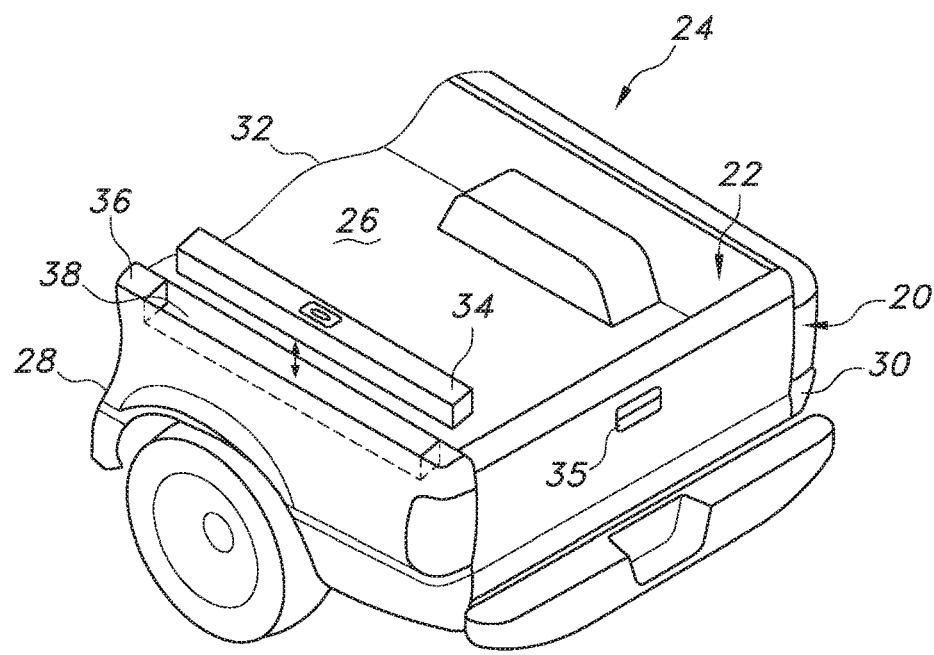
FIG. 3 is a partially cutaway view of a vehicle bed including a wall having a recess for receiving the sawhorse (not shown)

In any case, the recess 38 may be sized and shaped to correspond to a cross member 40 of the sawhorse 34, which may be hollow for receiving the folding legs 42 in a stowed configuration. As indicated in FIG. 2, the legs 42 may be mounted in spaced pairs and adapted for pivoting from within a recess formed by the at least partly hollow interior of the cross member 40 (which may be a generally rectangular structure) and back (see double headed action arrow A). Each pair of legs 42 may be associated with hinges 44 for folding (note arrow B) to help secure the sawhorse 34 in the erect condition when the legs are spread to lend stability.

As can be appreciated, the cross-member 40 may be made to match the appearance of the surrounding rail 36 so as to provide an aesthetically pleasing appearance, such as by matching the colors of the structures. The cross member 40 may also be provided with one or more handles 45, which may be recessed in a non-deployed configuration within the cross member 40 and adapted for pivoting for lifting the sawhorse 34 from the recess 38. Alternatively, the recess 38 may be oversized so that an at least finger-sized gap exists to allow for manual grasping and lifting of the sawhorse 34.

Figure 4:
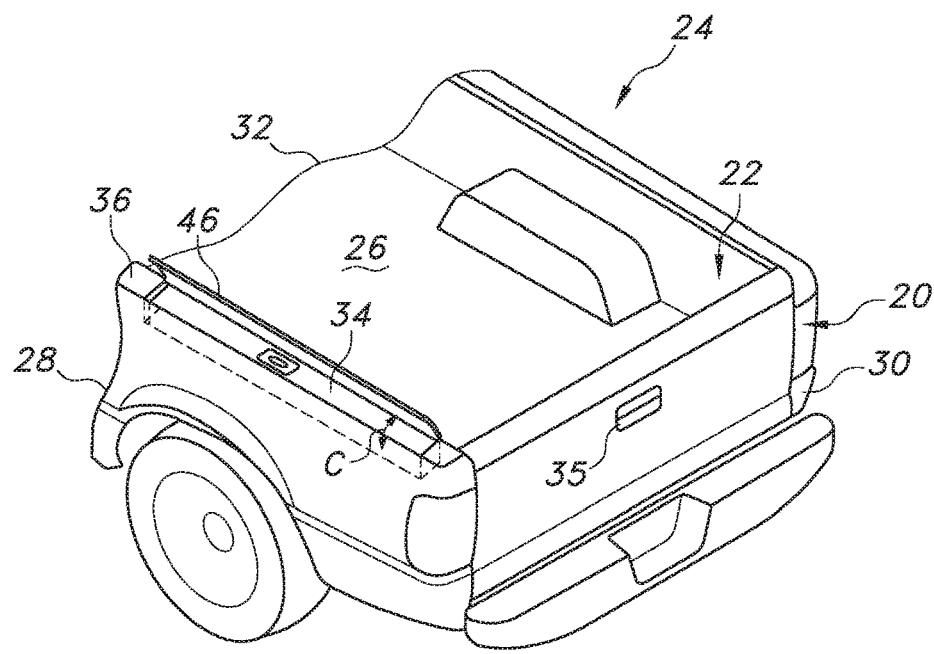
FIG. 4 is a partially cutaway view of a cover for the recess of FIG. 3.

In an alternative embodiment, as shown in FIG. 4, a cover 46 may be provided for covering the sawhorse 34 in the integrated, stowed condition. The cover 46 may be pivotally connected to the side rail 36 (note arrow C), and thus may be lifted to provide access to the sawhorse 34. Once removed, the cover 46 may be returned to a position covering the cavity or recess 38 (and a suitable gap may be provided to ensure that the cover 46 is flush with the surrounding portion of the vehicle, such as the upper surface of the first side rail 36). A lock (not shown) may also be provided to prevent theft of the sawhorse 34, which may be provided as part of the cover 46 or else directly as part of the sawhorse 34.

Figure 5:
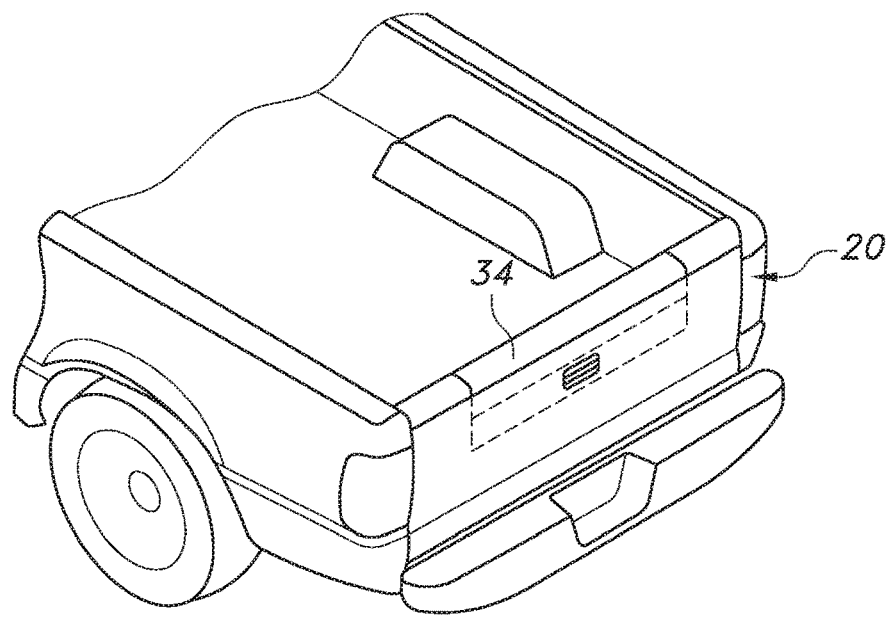
FIG. 5 is a partially cutaway view of a vehicle bed including a tailgate for receiving the sawhorse.

As can be appreciated, multiple sawhorses may also be provided, such as on each quarter panel 28, 30. One or more sawhorses 34 may also be recessed within the tailgate 20, as shown in FIG. 5 (including possibly in a stacked configuration, as indicated in phantom view). As can be appreciated, one of the sawhorses 34 and, in particular, the cross member 40, may actually form the upper portion of the tailgate 20, and thus it is desirable to confirm the appearance of it to match the surrounding portions as well.

Figure 6:
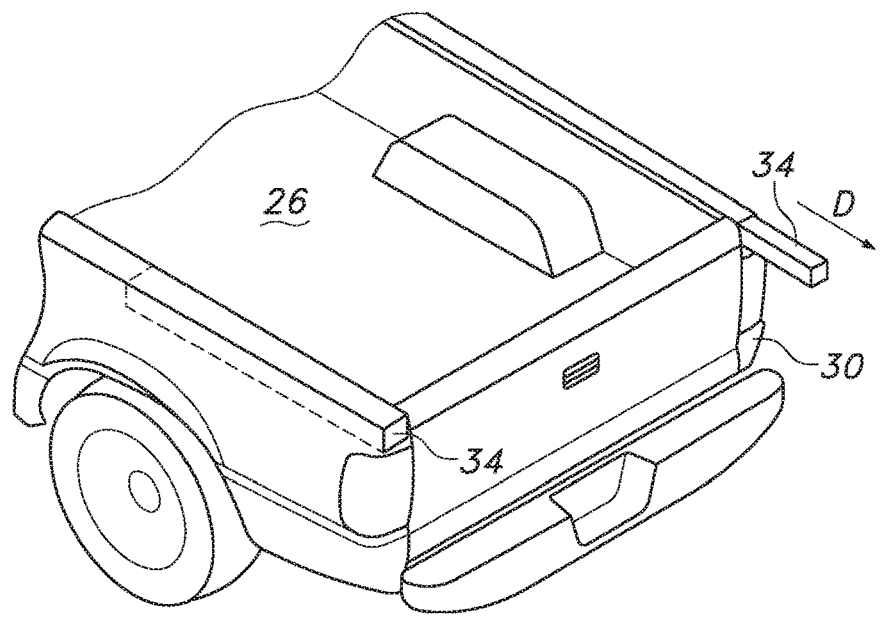
FIG. 6 is a partially cutaway view of a vehicle bed including an integrated sawhorse for being inserted and withdrawn in a travel direction.

The sawhorse 34 may also be recessed within one or both of the quarter panels, such as panels 28, 30 for being withdrawn in a horizontal manner, as shown in FIG. 6 (note withdrawal in travel direction D). A suitable latch, cap or plug (not shown) may be provided for preventing unintended release from the stowed position.

The components of the sawhorse 34 may be fabricated of the same or different materials. For instance, the cross member 40 may comprise a hard plastic material that can be colored to match the surrounding portions of the vehicle 24 (such as panels 28, 30), which would contribute only minimally to weight and provide a durable surface for supporting one or more workpieces (e.g., boards for being cut). The legs 42 may be made of lightweight metal, such as aluminum of stainless steel, to provide for stability without contributing excessively to weight. Of course, plastics could also be used for the legs 42 and metal used for the cross member 40.

In summary, numerous benefits are provided by providing a vehicle 24 such as a truck with an integrated sawhorse 34. By providing the sawhorse 34 such that it is in a recessed location along a side rail 36 forming part of a wall of a bed 26 including a cargo area, it does not occupy precious space for storing objects, thus keeping the floor 32 exposed for use. Yet, the sawhorse 34 may be readily deployed from an integrated condition for use on a job or construction site. Providing the sawhorse 34 as an integral part of the bed 26, such as along the upper portion of a side rail 36, and matching the appearance also provides an aesthetically pleasing arrangement. Furthermore, the sawhorse(s) may be kept out of sight when not in use, leading to a tidier appearance.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for a vehicle, comprising:
   a vehicle bed including a wall having a recess formed therein; and
   a sawhorse positioned in the recess in a stowed position and for being removed for use apart from the vehicle;
   wherein the recess is sized and shaped to correspond in size and shape to a cross member of the sawhorse.

2. The apparatus of claim 1, wherein the recess is provided in an upper surface of the wall.

3. The apparatus of claim 1, wherein the sawhorse forms an exterior surface of the wall.

4. The apparatus of claim 1, wherein the sawhorse comprises a cross member forming an exterior surface of the wall and a plurality of legs stowable within the cross member.

5. The apparatus of claim 4, wherein the cross member is color matched with the wall.

6. The apparatus of claim 1, further including a cover for covering the recess.

7. The apparatus of claim 1, wherein the recess is provided with an opening at a rear end of the vehicle bed for receiving the sawhorse in a travel direction of the vehicle directly from a position external to the vehicle bed.

8. The apparatus of claim 1, wherein the wall comprises a tailgate including an upper end having the recess for receiving the sawhorse.

9. The apparatus of claim 1, wherein the bed comprises a plurality of walls, each having a recess for receiving a different sawhorse.

10. A vehicle including the apparatus of claim 1.

11. A vehicle comprising a collapsible, removable sawhorse forming an integral portion of the vehicle, the sawhorse comprising a cross member and a plurality of legs depending therefrom in a deployed condition of the sawhorse, wherein the cross member in a stowed position is within a recess in a wall of the vehicle forming a portion of a vehicle bed, the recess having an opening: (i) at a rear end of the vehicle bed for receiving the sawhorse in a travel direction of the vehicle directly from a position external to the vehicle bed, (ii) on a top of the wall for receiving the sawhorse in a vertical direction transverse to the travel direction.

12. The vehicle of claim 11, further including a cover for covering the recess.

13. A method of providing a sawhorse in connection with a vehicle including a bed having a floor for receiving and supporting objects for transport, comprising:
   positioning the sawhorse in a recess formed in a wall at least partially defining the vehicle bed, the recess being sized and shaped to correspond in size and shape to a cross member of the sawhorse.

14. The method of claim 13, further including the step of unfolding legs recessed within the sawhorse to deploy the sawhorse.

15. The method of claim 13, further including the step of covering the recess including the sawhorse.

16. The apparatus of claim 11, wherein the recess is sized and shaped to correspond in size and shape to the cross member of the sawhorse.

17. The apparatus of claim 11, wherein the wall comprises a tailgate.

\* \* \* \* \*